US011169393B2

(12) United States Patent
Brick et al.

(10) Patent No.: US 11,169,393 B2
(45) Date of Patent: Nov. 9, 2021

(54) 3D DISPLAY ELEMENT

(71) Applicant: OSRAM Opto Semiconductors GmbH, Regensburg (DE)

(72) Inventors: Peter Brick, Regensburg (DE); Hubert Halbritter, Dietfurt (DE); Mikko Perälä, Tampere (FI)

(73) Assignee: OSRAM OLED GMBH, Regensburg (DE)

( * ) Notice: Subject to any disclaimer, the term of this patent is extended or adjusted under 35 U.S.C. 154(b) by 137 days.

(21) Appl. No.: 16/492,093

(22) PCT Filed: Mar. 7, 2018

(86) PCT No.: PCT/EP2018/055610
§ 371 (c)(1),
(2) Date: Sep. 6, 2019

(87) PCT Pub. No.: WO2018/162560
PCT Pub. Date: Sep. 13, 2018

(65) Prior Publication Data
US 2020/0159038 A1 May 21, 2020

(30) Foreign Application Priority Data
Mar. 7, 2017 (DE) .......................... 102017104757.3

(51) Int. Cl.
*G02F 1/1335* (2006.01)
*G02B 30/27* (2020.01)
(52) U.S. Cl.
CPC ....... *G02B 30/27* (2020.01); *G02F 1/133526* (2013.01)

(58) Field of Classification Search
None
See application file for complete search history.

(56) References Cited

U.S. PATENT DOCUMENTS 5,943,166 A * 8/1999 Hoshi ................... G02B 30/36
359/475
2006/0176245 A1 8/2006 Sakai et al.
(Continued)

FOREIGN PATENT DOCUMENTS

CN 205539739 U 8/2016
WO 2015192646 A1 12/2015

OTHER PUBLICATIONS

Geng, J., "Three-Dimensional Display Technologies," IEEE Intelligent Transportation Systems Society, Advances in Optics and Photonics, vol. 5, Nov. 22, 2013, 80 pages.
(Continued)

*Primary Examiner* — Thanh Nhan P Nguyen
(74) *Attorney, Agent, or Firm* — Slater Matsil, LLP

(57) ABSTRACT

A 3D display element is disclosed. In an embodiment a 3D display element includes a light-emitting component configured to emit light and an optical arrangement, wherein the light-emitting component includes a plurality of triplets, each triplet including a first, a second and a third light-emitting region, wherein the triplets are arranged side by side in a first lateral plane, wherein the regions are arranged side by side in the first lateral plane, wherein the optical arrangement is configured to diverge light of adjacent triplets passing through the optical arrangement, and wherein light of a triplet passing through the optical arrangement is mixed.

9 Claims, 7 Drawing Sheets

(56) References Cited

U.S. PATENT DOCUMENTS

| | | |
|---|---|---|
| 2007/0114907 A1 | 5/2007 | Chiang et al. |
| 2009/0153542 A1 | 6/2009 | Arneson et al. |
| 2009/0237914 A1 | 9/2009 | Lai et al. |
| 2013/0321246 A1 | 12/2013 | Li et al. |
| 2015/0015456 A1 | 1/2015 | Uchida et al. |
| 2015/0261000 A1 | 9/2015 | Ohbitsu |
| 2017/0155891 A1 | 6/2017 | Hu et al. |

OTHER PUBLICATIONS

Hong, J. et al., "Three-Dimensional Display Technologies of Recent Interest: Principles, Status, and Issues [Invited]," Applied Optics, vol. 50, No. 34, 2011 Optical Society of America, Dec. 1, 2011, 29 pages.

Xiao, X. et al., "Advances in Three-Dimensional Integral Imaging: Sensing, Display, and Applications [Invited]," Applied Optics, vol. 52, No. 4, 2013 Optical Society of America, Feb. 1, 2013, 15 pages.

\* cited by examiner

3D DISPLAY ELEMENT

This patent application is a national phase filing under section 371 of PCT/EP2018/055610, filed Mar. 7, 2018, which claims the priority of German patent application 102017104757.3, filed Mar. 7, 2017, each of which is incorporated herein by reference in its entirety.

TECHNICAL FIELD

A 3D display element is specified.

SUMMARY OF THE INVENTION

Embodiments provide a 3D display element with improved color rendering.

The 3D display element is, for example, a display element of a television set, a monitor or a video wall. The 3D display element is configured to display images composed of a large number of pixels. The color value and/or the brightness value of each pixel depend in at least one spatial direction on the viewing angle.

The 3D display element does not require any additional technical aids, such as glasses with shutters or polarization filters, to create a three-dimensional image impression. In particular, the 3D display element is configured to create a three-dimensional image impression of displayed images when viewed with the naked eye.

For example, the 3D display element is an autostereoscopic display element. In particular, a pixel has different discrete brightness and/or color values along a spatial angle. For an observer, exactly two different brightness and/or color values of each pixel are perceptible. For example, each pixel has at least five separately adjustable brightness and/or color values.

According to at least one embodiment, the 3D display element comprises a light-emitting component configured to emit light. For example, the optoelectronic component comprises a plurality of light emitting regions arranged side by side in a first lateral plane. For example, the regions are arranged at the lattice points of a rectangular lattice, a hexagonal lattice, or another periodic lattice side by side in the first lateral plane. In particular, the light-emitting component comprises at least one semiconductor chip comprising a plurality of light emitting regions that are arranged side by side in the first lateral plane. Alternatively, each light-emitting region of the light-emitting component can be formed by at least one semiconductor chip.

The light-emitting component is configured to emit light during normal operation. In particular, the light-emitting component is configured to emit light of different color coordinates and brightness values along the first lateral plane.

For example, the light-emitting component is configured to emit light in the wavelength range visible to humans, in particular in the wavelength range between UV radiation and infrared radiation. The light-emitting component has a beam direction in which the light generated in the light-emitting component is emitted. In particular, the light emitted by the light-emitting component is divergent. In particular, a majority of the emitted light is emitted in the beam direction.

According to at least one embodiment, the 3D display element comprises an optical arrangement configured to influence light. In particular, the optical arrangement is configured to influence the light emitted by the light-emitting component. In particular, the optical arrangement influences the light by reflection, refraction and/or diffraction. The optical arrangement is subordinate to the light-emitting component in the beam direction so that, for example, at least 80% of the emitted light impinges the optical arrangement.

According to at least one embodiment of the 3D display element, the light-emitting component comprises a plurality of triplets each comprising a first, a second and a third light emitting region. For example, the regions of a triplet are arranged directly adjacent to each other. In this context, adjacent to each other means that along the first lateral plane between the regions of a triplet no further regions are arranged. In particular, the regions of a triplet are configured to emit light of a different wavelength range. Furthermore, the regions of a triplet can be operated separately from each other. For example, the regions of a triplet are configured to mix the emitted light during normal operation. In particular, the mixed light from regions of a triplet has a definable color location. In particular, each triplet comprises a first region which emits light in the red wavelength range, a second region which emits light in the green wavelength range and a third region which emits light in the blue wavelength range.

According to at least one embodiment of the 3D display element, the triplets are arranged side by side in a first lateral plane. For example, the triplets are arranged at the grid points of a regular rectangular grid, hexagonal grid, or another periodic grid in the first lateral plane.

According to at least one embodiment of the 3D display element, the regions are arranged side by side in the first lateral plane. For example, the regions are arranged at the grid points of a regular rectangular grid, hexagonal grid, or other periodic grid in the first lateral plane.

According to at least one embodiment of the 3D display element, the optical arrangement diverges light of adjacent triplets passing through the optical arrangement. For example, the triplets emit light, with at least one directional component of the emitted light lying in the beam direction of the light-emitting component. Before passing through the optical arrangement, parts of the light emitted by adjacent triplets may be parallel or convergent. The optical arrangement is configured to influence the emitted light so that after passing through the optical arrangement, emitted light of different triplets diverges. In particular, the light from adjacent triplets that passes through the optical arrangement diverges, for triplets associated with the same pixel of the 3D display element. For example, after passing through the optical arrangement, diverging light does not have a common intersection point. In particular, the distance of the light from adjacent triplets increases along the beam direction after passing through the optical arrangement.

According to at least one embodiment of the 3D display element, light of a triplet passing through the optical arrangement is mixed. Mixed light from a triplet can be assigned to the triplet, but the mixed light cannot be assigned to individual regions of the triplet. In particular, the light of different light emitting regions of a triplet can be distinguished before passing through the optical arrangement, so that an observer can assign the emitted light of individual regions of a triplet to these individual regions. In particular, the light of different light emitting regions of a triplet cannot be distinguished after passing through the optical arrangement, so that an observer perceives the light of a triplet as mixed light.

For example, light of a triplet passing through the optical arrangement is parallelized. For example, at least 80 percent of the light emitted by a triplet runs parallel to each other after passing through the optical arrangement.

According to at least one embodiment, the 3D display element comprises a light-emitting component configured to emit light and an optical arrangement configured to influence the light, wherein the light-emitting component comprises a plurality of triplets each comprising a first, a second and a third light-emitting region, the triplets are arranged side by side in a first lateral plane, the regions are arranged side by side in the first lateral plane, the optical arrangement diverges light of adjacent triplets passing through the optical arrangement, and light of a triplet passing through the optical arrangement is mixed.

A 3D display element described here is based, among other things, on the following considerations. In autostereoscopic display elements, several triplets of light-emitting regions are often used to display a single pixel. For example, the triplets are arranged next to each other in a first lateral plane. The light emitted by the triplets passes through an optical arrangement which, for example, has a large number of lenses. For example, light from triplets associated with a common pixel passes through a common lens of an optical arrangement, so that for an observer each lens represents a pixel of the image displayed by the 3D display element. After passing through the lens, the light of different triplets diverges, so that the light of different triplets is perceived when viewing a pixel depending on a spatial angle. In particular, the light-emitting regions assigned to a common triplet are arranged next to each other in the first lateral plane. Thus the light of different regions, which are assigned to a common triplet, diverges after passing through the optical arrangement. As a result, the impression of color and/or brightness unintentionally varies along a spatial angle. In particular, light from different regions of a triplet is not perceived by an observer as mixed light, but is perceived separately depending on the spatial angle. This leads to a distorted representation of colors and brightness when reproducing images using a 3D display element.

The 3D display element described here now makes use, among other things, of the idea of using an optical arrangement that is subordinate to the light-emitting component in the beam direction. The optical arrangement is configured to influence light emitted by the light-emitting component so that light passing through the optical arrangement diverges from adjacent triplets of a common pixel. Furthermore, the optical arrangement is configured to mix light from a triplet.

Advantageously, color and brightness rendering of the 3D display element are improved, since the color location and brightness of the light emitted by a triplet do not vary along any spatial angle, but are perceived as mixed light.

According to at least one embodiment of the 3D display element, the first, second and third regions emit pairwise light of a different wavelength range. For example, the first region emits light of a red wavelength range, the second region emits light of a green wavelength range, and the third region emits light of a blue wavelength range. In particular, the color location of the mixed light of the regions can be adjusted by means of targeted control of the regions. In particular, the regions of a triplet can have a different emission area. For example, the emission area of the second region is larger than the emission area of the first region and the emission area of the first region is larger than the emission area of the third region. It is advantageous that a particularly large part of the RGB color space can be represented by the regions.

According to at least one embodiment of the 3D display element, the optical arrangement comprises a first and a second optical element, and the first and the second optical element are successively arranged in the beam direction in the beam path of the light. For example, the first and second optical elements may have different functions. In particular, the first optical element is a diffractive and/or refractive optical element. In particular, the second optical element is a diffractive and/or refractive optical element.

Advantageously, the first and the second optical element can have different optical functions. For example, the first optical element refracts light from adjacent triplets in different spatial directions. In particular, the light of all triplets assigned to a common pixel is refracted into different spatial directions by the first optical element. For example, the second optical element mixes light from a common triplet.

The first and second optical elements are subordinated to the light-emitting component in the beam direction. For example, the light, in particular all the light, of the display element, which is perceived by an observer of the display element, passes through the first and the second optical element. Advantageously, different functions of the optical arrangement can be realized by means of the first and the second optical element. For example, the first optical element is used to assign triplets to pixels and the second optical element is used to compensate image errors.

According to at least one embodiment of the 3D display element, the first optical element comprises a lens array in which a plurality of lenses are arranged side by side in a second lateral plane, wherein the number of triplets is greater than the number of lenses of the lens array. For example, the lens array comprises a plurality of lenses configured to refract light from adjacent triplets in different spatial directions. The surface of the lenses facing the light-emitting component and/or the surface of the lenses facing away from the light-emitting component can each be convexly curved. In particular, the lens array is designed contiguously so that the individual lenses are mechanically firmly connected to each other. For example, the lenses of the lens array are arranged in the second lateral plane along the grid points of a regular rectangular grid. In particular, the second lateral plane is parallel to the first lateral plane.

Several triplets can be assigned to each lens of the lens array. For example, the number of triplets is at least five times greater, especially at least nine times greater than the number of lenses. In particular, the light of a triplet passes through exactly one lens of the lens array. In other words, each triplet is uniquely assigned to one lens of the lens array. In particular, the lens array defines the pixels of the 3D display element. In this case, each lens of the lens array corresponds to a pixel perceived by an observer. The different triplets assigned to a common pixel or lens reflects the different color and brightness values in different spatial directions of the pixel. Advantageously, each lens of the lens array is assigned a particularly large number of triplets. Thus, a particularly large number of different color and brightness values can be reproduced from different observing angles, so that the image represented by the 3D display element is reproduced in particular detail.

According to at least one embodiment of the 3D display element, the lens array is formed with a plurality of cylindrical lenses. The main extension direction of the cylindrical lenses can each be along the second lateral plane. In particular, the main extension directions of the cylindrical lenses run parallel to each other. For example, the triplets of different pixels can be assigned to a cylindrical lens along its main extension direction. The triplets of a common pixel can be arranged crosswise, in particular perpendicular, to the main extension direction of the cylindrical lens. In particular, a 3D display device has exactly one observing plane in which the 3D display element reproduces an image with a three-dimensional image impression.

According to at least one embodiment of the 3D display element, the first lateral plane and/or the second lateral plane are curved. For example, the first lateral plane and the second lateral plane are convex or concave. In particular, the first and second lateral planes have a common center of curvature. Alternatively, the first and second lateral planes have the same radius of curvature. Advantageously, a curvature of the first and/or second lateral plane can be used to enhance the three-dimensional image impression for an observer.

According to at least one embodiment of the 3D display element, a lens of the lens array is arranged in the beam path of the light of at least five triplets. For example, the light of at least five triplets, in particular at least nine triplets, passes through a common lens of the lens array. In particular, each lens of the lens array is arranged in the light path of at least five, in particular at least nine, triplets. Advantageously, each triplet assigned to a lens can be used to display a different brightness and a different color location of a pixel depending on the viewing angle. Thus, five, and in particular nine, triplets can be used to display five or nine different color coordinates and brightness values for a pixel.

According to at least one embodiment, triplets assigned to a common pixel are arranged side by side in at least two directions along the first lateral plane. Triplets that are assigned to a common pixel are preferably arranged side by side in at least four, in particular at least eight, directions along the first lateral plane. For example, the light from triplets associated with a common lens of the lens array diverges along at least two, preferably at least four, in particular at least eight, spatial angle regions. In particular, each lens is arranged perpendicular to the first lateral plane above the geometric center of gravity of the plurality of triplets associated with the lens. Thus a three-dimensional image can be reproduced by means of the 3D display element along at least two different spatial angle ranges. In particular, the light diverges along a plurality of spatial angle ranges. For example, the 3D display element is viewed by an observer with two eyes. A three-dimensional image impression is created when the eyes and a spatial angle range along which the emitted light diverges lie in a common observing plane. Advantageously, the 3D display element has a plurality of spatial angle regions along which the light of the triplets assigned to a common lens diverges. Thus, when the 3D display element rotates relative to the observers' two eyes around an axis perpendicular to the second lateral plane, the 3D display element has a plurality of viewing planes in which the 3D display element reproduces an image with a three-dimensional image impression.

According to at least one embodiment of the 3D display element, the first optical element is arranged in the beam path between the light-emitting component and the second optical element, the second optical element is a diffractive optical element, and the light-emitting component is disposed in the focal plane of the first optical element. For example, the light emitted by the light-emitting component impinges first the first optical element and then the second optical element. In particular, light emitted from different regions of a triplet is not parallel, in particular divergent, before it impinges the second optical element.

The second optical element, for example, is a diffractive grating configured to influence the light emitted by the regions by diffraction. For example, the grating is configured to diffract the light of the first, second and third regions so that the light of the first diffraction order of the regions of a triplet is parallel within a predetermined tolerance range. In particular, the second optical element is a blaze grating configured to exhibit particularly high diffraction efficiency at a predetermined diffraction order. In particular, a diffraction order of the second optical element is configured such that the light of different regions after passing through the second optical element is parallel within a predetermined tolerance. In particular, the diffraction order can be the first or the second diffraction order. For example, the divergence angle between light emitted from different regions of a triplet corresponds to the difference between the diffraction angles of a diffraction of the same order after passing through the second optical element.

For example, the first lateral plane along which the triplets are arranged side by side is located in the focal plane of the lenses of the first optical element. Light impinging on the first optical element from a point in the focal plane runs parallel, in particular collimated, after passing through the first optical element. Advantageously, light emitted by a region is mixed after passing through the first optical element, so that the light of different regions of a triplet cannot be assigned to the individual regions. In particular, light from different regions associated with a common lens of the first optical element is divergent after passing through the first optical element.

For example, the first and second optical elements are arranged in direct contact with each other. In particular, the distance between the first and second optical elements perpendicular to the first lateral plane is less than 5 µm.

According to at least one embodiment of the 3D display element, the first, second and third regions are arranged side by side along a common lateral direction. In particular, the first, second and third regions of all triplets are arranged side by side along the same lateral direction. For example, this arrangement causes the light of different regions of a common triplet to diverge in exactly one spatial direction. In particular, the light diverging in exactly one spatial direction can be compensated by means of a second optical element, whereby the second optical element is, for example, a grating, in particular a blaze grating. Advantageously, this divergence can be compensated by a second optical element by diffraction in one spatial direction, so that the light of a triplet is emitted as mixed light.

According to at least one embodiment of the 3D display element, the second optical element is arranged in the beam path between the light-emitting component and the first optical element, wherein the second optical element is a grating which respectively forms a frame around each triplet and the second optical element is arranged in the focal plane of the first optical element. For example, light emitted from the light-emitting component passes first through the second optical element and then through the first optical element. In particular, the second optical element is not a diffraction grating.

For example, the second optical element is a plate with openings that completely penetrate the plate perpendicular to its main extension plane. For example, the size of the openings in the lateral direction is at least as large as the size of a triplet along the first lateral plane. For example, the grating constant of the second optical element is not in the order of the wavelength range of the light emitted by the light-emitting component. In particular, the grating constant of the second optical element is as large as the distance between adjacent triplets. For example, the plate is arranged in such a way that the projection onto the plane in which the triplets are arranged forms a frame around the triplets. In particular, the triplets are surrounded by the second optical element in lateral directions. The second optical element can be reflective for the light emitted by the light-emitting component. For example, the second optical element is formed with a metallic material.

For example, at least part of the light emitted by the triplets impinges surfaces of the second optical element. In particular, at least part of the light emitted by the triplets impinges the surfaces of the second optical element that frame the optoelectronic regions. For example, the side of the second optical element facing away from the light-emitting component is arranged in the focal plane of the first optical element. In particular, the second optical element is configured to mix the light emitted by regions of a common triplet. For example, an observer perceives the light passing through the second optical element as mixed light of the electromagnetic radiation of the regions of a triplet. In particular, the light of different triplets is not mixed after passing through the second optical element.

According to at least one embodiment of the 3D display element, a depth of the second optical element perpendicular to the first lateral plane is at least half the edge length of a triplet in the first lateral plane. In particular, as the depth of the second optical element increases, the light from different regions of a triplet becomes increasingly mixed. For example, the depth of the second optical element is at least 50 µm, in particular at least 100 µm, preferably at least 500 µm. In particular, the second optical element and the light-emitting component are in direct contact with each other. For example, each triplet is assigned exactly one opening of the second optical element. Advantageously, the light of different regions of a triplet is particularly well mixed by means of a deep second optical element, so that the light of each triplet is perceived as homogeneous light which has a common color location.

According to at least one embodiment of the 3D display element, the depth of the second optical element varies along the first lateral plane. For example, the depth of the second optical element varies periodically along the first lateral plane. In particular, the depth of the second optical element is different from a triplet associated with a common pixel. For example, the closer the second optical element is to the geometric center of gravity of a lens of the first optical element, the lower the depth of the second optical element. Advantageously, the image field curvature of the lenses of the first optical element is at least partially compensated by such a design of the second optical element.

BRIEF DESCRIPTION OF THE DRAWINGS

Advantageous embodiments and developments of the 3D display element will become apparent from the exemplary embodiments described below in association with the figures.

In the figures.

In the exemplary embodiments and figures, similar or similarly acting constituent parts are provided with the same reference symbols. The elements illustrated in the figures and their size relationships among one another should not be regarded as true to scale. Rather, individual elements may be represented with an exaggerated size for the sake of better representability and/or for the sake of better understanding.

DETAILED DESCRIPTION OF ILLUSTRATIVE EMBODIMENTS

Figure 1A:
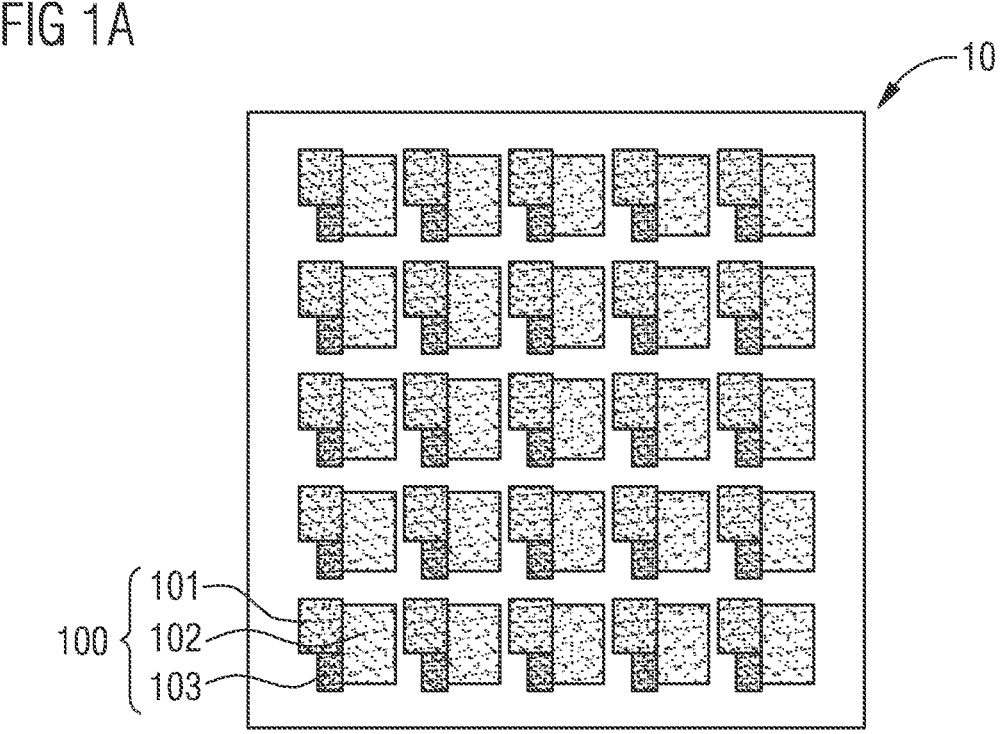
FIG. 1A shows a schematic plan view of a light-emitting component of a 3D display element according to a first example.

FIG. 1A shows a schematic plane view of a light-emitting component 10 of a 3D display element 1. The light-emitting component 10 comprises a plurality of triplets wo which are arranged at a distance from each other in a lateral plane E1. Each triplet 100 comprises a first 101, a second 102, and a third 103 light emitting region. All regions 101, 102, 103 of each triplet wo can be controlled separately. During normal operation, the first regions emit 101 light L in the red wavelength range. In normal operation, second regions emit 102 light L in the green wavelength range. During normal operation, third regions emit 103 light L in the blue wavelength range. The regions 101, 102, 103 are configured to emit mixed light of a predetermined color location and a predetermined brightness during intended operation. In particular, the triplets wo are mechanically connected to each other. For example, the regions of a triplet are produced in a common process, whereby the different wavelength ranges of the emitted light L of different regions 101, 102, 103 of a triplet are produced by means of different conversion elements. Alternatively, the regions 101, 102, 103 of a triplet are formed in different manufacturing processes using different materials. In particular, the light-emitting component 10 comprises at least one semiconductor chip comprising a plurality of light emitting regions 101, 102, 103 arranged side by side in the first lateral plane E1. Alternatively, in the light-emitting component 10, each light-emitting region 101, 102, 103 can be formed by at least one semiconductor chip.

Each regions has an emission area through which a large part of the light L is emitted during normal operation. For example, the second regions 102 in the lateral plane have a larger emission area than the first regions 101. In particular, regions 101 in the lateral plane have a larger emission area than regions 103 in the third plane.

Figure 1B:
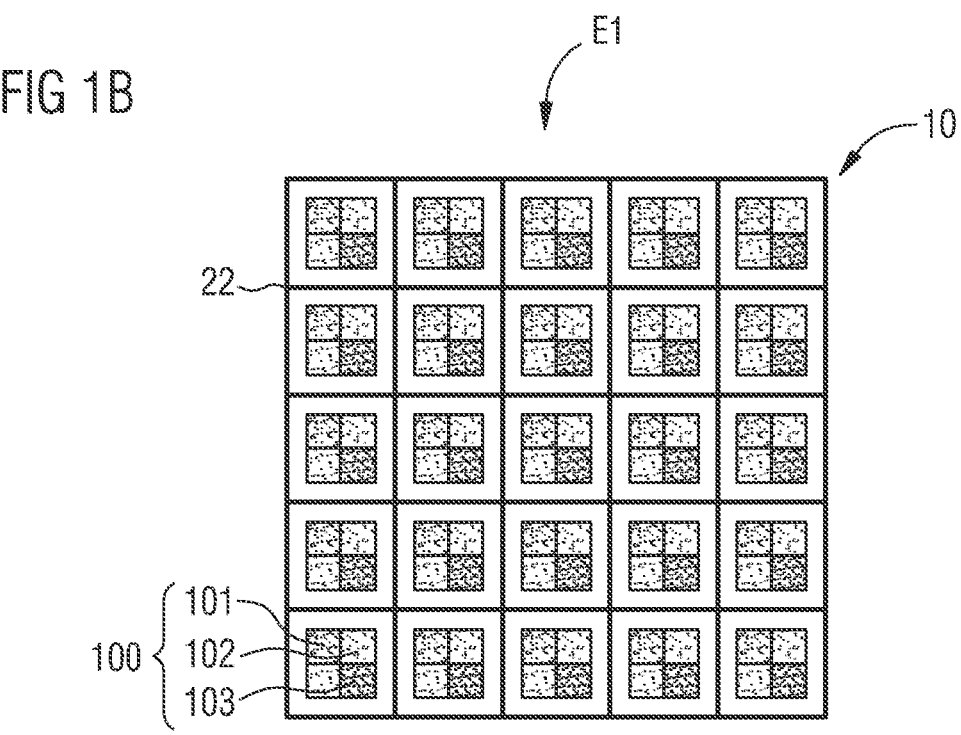
FIGS. 1B and 1C show schematic plan views of a light-emitting components having a second optical element of a 3D display element according to a second and third example.

FIG. 1B shows a schematic plan view of a light-emitting component 10 and a second optical element 22 of a 3D display element. The light-emitting component 10 comprises a plurality of triplets wo, each with a first 101, a second 102 and a third 103 region, which are arranged next to each other in the first lateral plane E1. In particular, the lateral distance from adjacent triplets is greater than the distance from regions associated with a common triplet 100. In this example, each triplet wo has an additional second region 102, which in normal operation is configured to emit light L in the green wavelength range. It is advantageous to use the additional second region 102 to adjust the color coordinates of the mixed light of each triplet wo particularly precisely. In particular, a triplet wo can alternatively include an additional third region 103 or an additional first region 101 instead of the additional second region 102.

Furthermore, a second optical element 22 is arranged on the first lateral plane E1, which has the shape of a grating. The periodicity of the grating corresponds exactly to the periodicity of the triplets wo along the first lateral plane E1, so that the second optical element 22, at least in the projection onto the first lateral plane E1, frames each individual triplet 100. That is, at least in projection onto the first lateral plane E1, each triplet wo is completely surrounded by the second optical element in lateral directions. In particular, the second optical element 22 is a plate 221 with openings 222, wherein the openings 222 completely penetrate the plate 221 perpendicular to its main extension direction. For example, the openings are at least as large in lateral directions as the triplets 100. For example, the second optical element is formed with a material L that reflects the light emitted by the triplets 100.

Figure 1C:
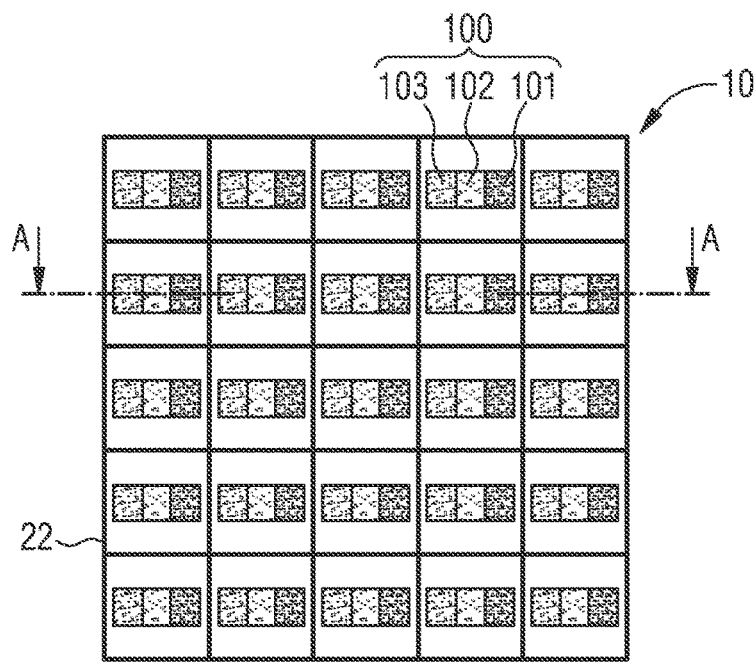

FIG. 1C shows a schematic plan view of a light-emitting component 10 and a second optical element 22 of a 3D display element according to a third example. In contrast to the second example shown in FIG. 1B, the light emitting regions 101, 102, 103 of each triplet 100 are arranged next to each other in the same first lateral direction R1. In particular, the emission areas of the regions 101, 102, 103 of each triplet are the same size.

Figure 1D:
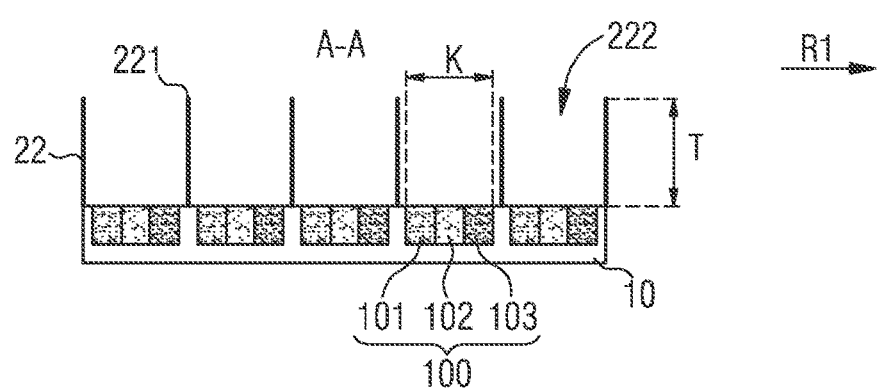
FIGS. 1D and 1E show schematic sectional views of the light-emitting component and the second optical element of a 3D display element along the A-A intersection shown in FIG. 1C.

FIG. 1D shows a schematic sectional view of the third example of a light-emitting component 10 and a second optical element 22 of a 3D display element shown in FIG. 1C. Each triplet 100 has an edge length K along the first 101, second 102, and third 103 regions. Further, the second optical element 22 has a depth T which is perpendicular to the main extension plane of the light-emitting component 10. For example, the depth T is at least half the size of the edge length K of a triplet 100. In particular, the depth T is at least as large as the edge length K.

Advantageously, by means of such a second optical element 22, a particularly good mixing of the light L emitted by the first 101, the second 102 and the third 103 regions is achieved. For example, an observer of electromagnetic radiation L emitted by the light-emitting component 10 and passing through the second optical element 22 can perceive it as mixed light. This means that an observer cannot assign the light L to the individual regions 101, 102, 103 after passing through the second optical element 22.

Figure 1E:
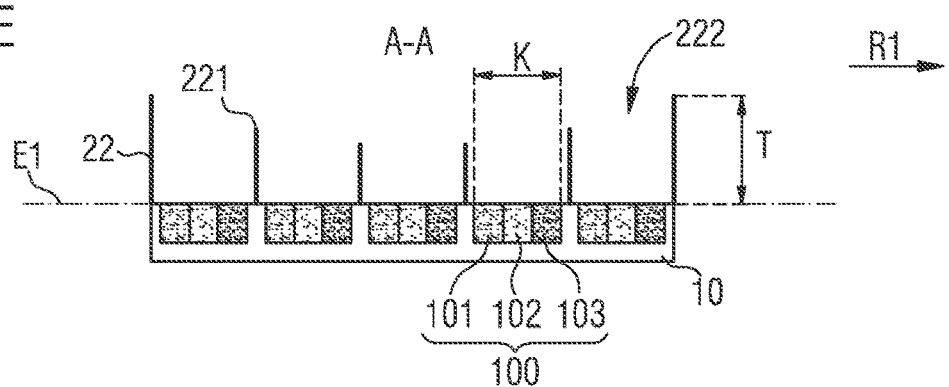

FIG. 1E shows a schematic sectional view of the third example of a light emitting component 10 and a second optical element 22 of a 3D display element shown in FIG. 1C. Unlike the example shown in FIG. 1E, the depth T of the second optical element 22 varies along the first lateral plane E1. For example, the shown triplets wo are assigned to a common pixel. In a 3D display element, the triplets wo, which are assigned to a common pixel, are followed by a common lens 210 of a first optical element 21. For example, the depth T of the second optical element 22 varies periodically along the first lateral plane E1. For example, the closer the second optical element is to the geometric center of gravity of a lens 210 of the first optical element 21 along the first lateral plane E1, the lower the depth of the second optical element. Advantageously, such a configuration of the second optical element 22 at least partially compensates the field curvature of the lenses 210 of the first optical element 21.

Figure 2A:
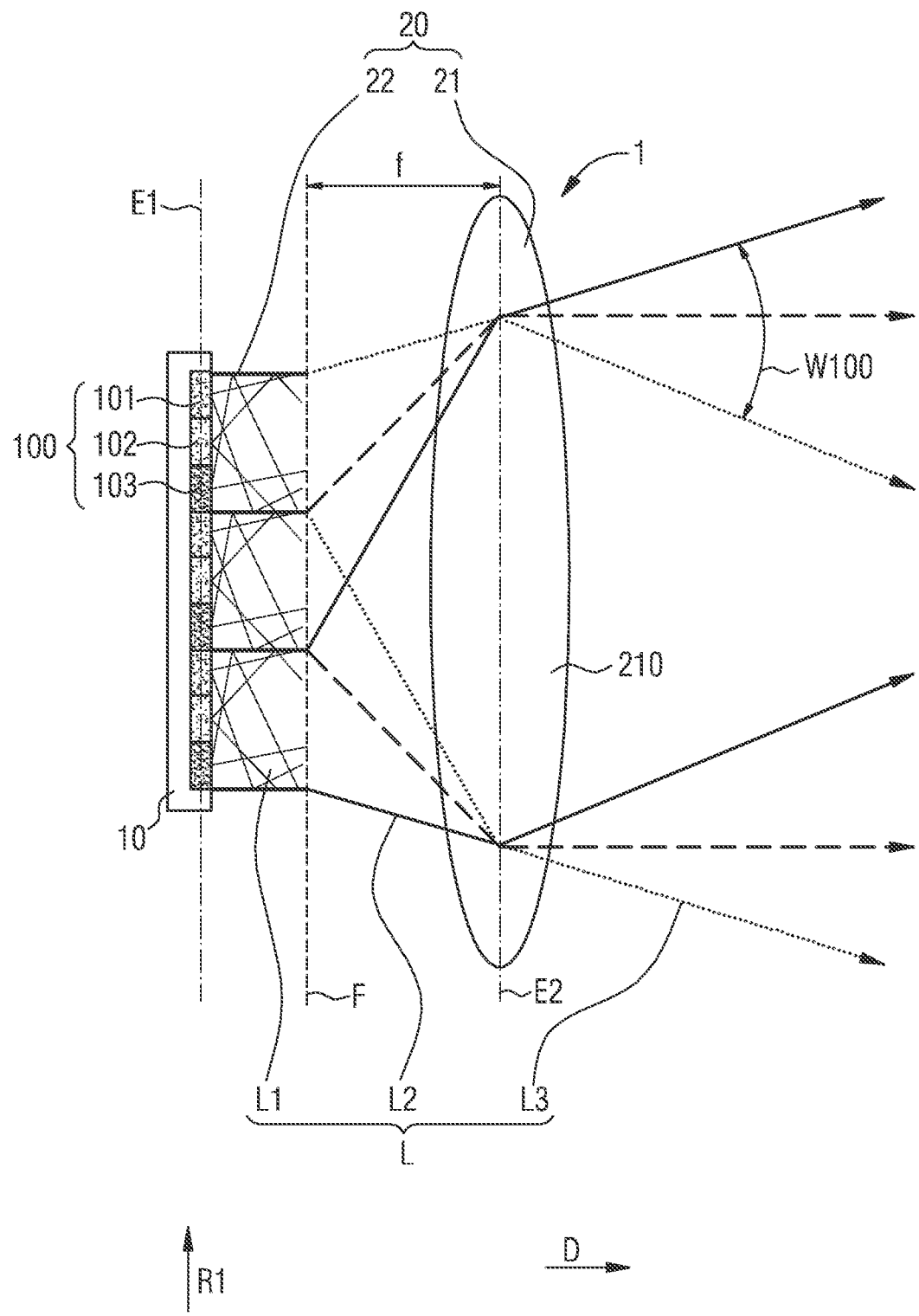
FIG. 2A shows a schematic sectional view of a pixel of a 3D display element according to a first example.

FIG. 2A shows a schematic sectional view of a pixel P of a 3D display element described here according to a first example. The 3D display element comprises a light-emitting component 10 and an optical arrangement 20 comprising a first optical element 21 and a second optical element 22. The light-emitting component 10 comprises a plurality of triplets 100 with first 101, second 102 and third 103 light emitting regions. The regions of all Triplets 100 are arranged side by side in a common first lateral plane E1. The light-emitting component 10 is configured to emit light L perpendicular to its main extension direction in a beam direction D during intended operation.

The second optical element 22 is arranged in the beam direction D between the light-emitting component 10 and the first optical element 21. This means that light L emitted by the light-emitting component 10 first passes through the second optical element 22 and then through the first optical element 21. For example, the second optical element 22 is arranged in direct contact with the light-emitting component 10. In particular, the triplets are each arranged in the second optical element 22, so that the triplets 100 in the first lateral plane E1 are each completely surrounded by the second optical element 22. The first optical element 21 is arranged at a distance from the second optical element 22 in a second lateral plane E2. In particular, the side of the second optical element 22 remote from the light-emitting component 10 is arranged in a focal plane F of the first optical element 21 with a tolerance of ±20%, preferably ±10%, of the focal length of the first optical element 21.

For example, the first optical element 21 comprises at least one lens 210 which is configured to influence the light L emitted by the light-emitting component 10. In particular, the light L of a plurality of triplets 100 hits a lens 210 of the first optical element 21. For example, the light L of at least five, in particular nine, triplets 100 hits a lens 210 of the first optical element 21.

The triplets 100 each emit light L1 through the first 101, second 102 and third 103 regions. The light L1 of the regions 101, 102, 103 is not, or not completely, mixed. In particular, an observer can assign the light L1, which has not yet passed through the second optical element 22, to the first 101, the second 102 or the third 103 region respectively. After the light L has passed through the second optical element 22, it becomes mixed light L2.

The mixed light L2 can be assigned to the individual triplets 100 by an observer. In particular, the light L2 is homogeneous in terms of its color location and brightness. In other words, an observer can assign the light L2 to a triplet 100, but not to the individual regions 101, 102, 103 of the triplet 100.

The mixed light L2 passes through the first optical element 21. The mixed light L2, which has passed through the first optical element 21, is divergent light L3. The light L3 of different triplets 100 diverges when it has passed through the same lens 210. In particular, light L3 of different triplets 100 is divergent along a common spatial angle when the different triplets 100 are arranged side by side in a common further first lateral direction R1.

Figure 2B:
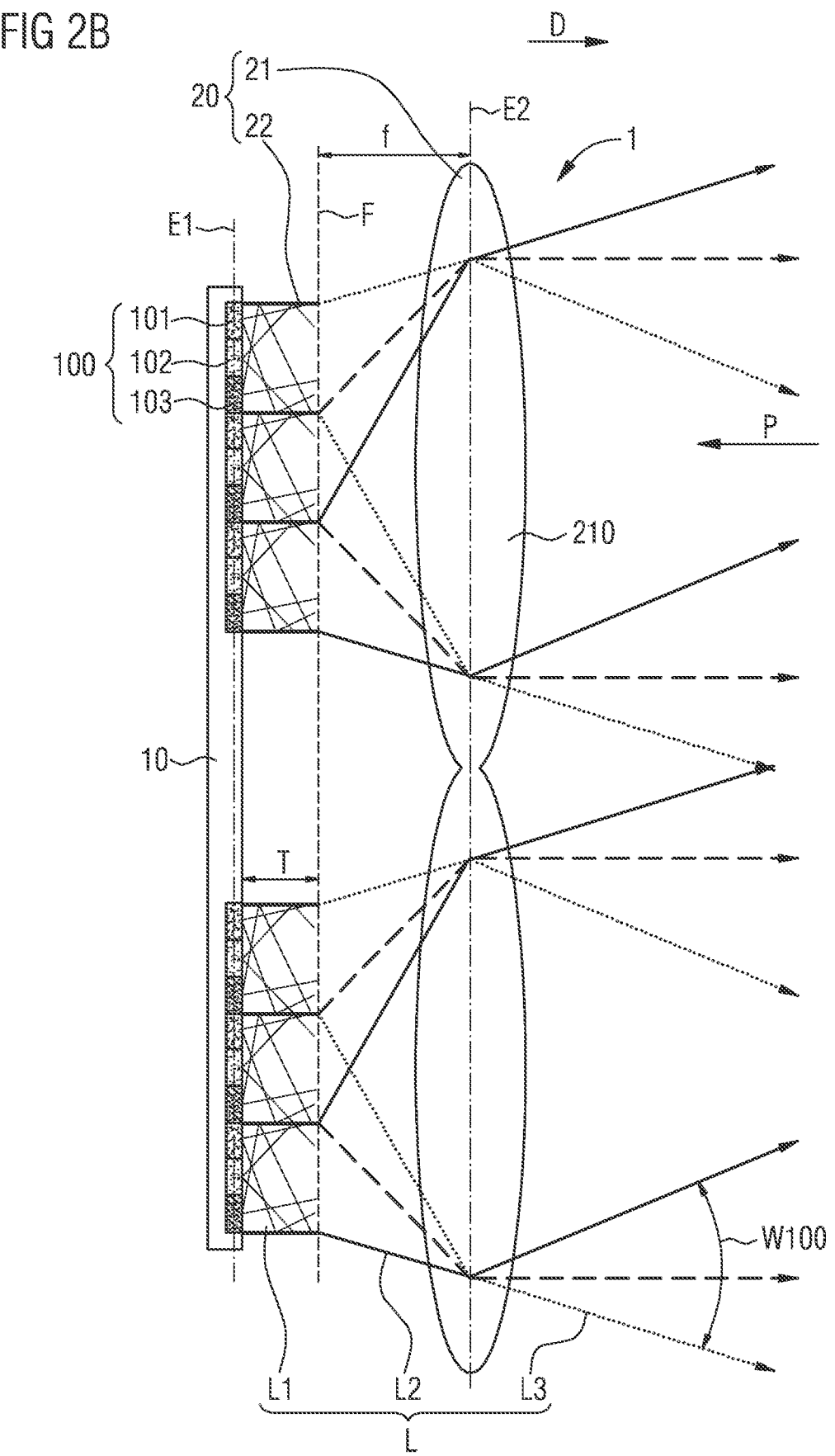
FIG. 2B shows a schematic sectional view of two pixels of a 3D display element according to a second example.

FIG. 2B shows a schematic sectional view of a 3D display element 1 described here according to a second example. Analogous to the first example of the 3D display element 1, the 3D display element comprises a light-emitting component 10 and an optical arrangement 20 comprising a first optical element 21 and a second optical element 22. The first optical element 21 comprises a plurality of lenses 210 arranged side by side in a second lateral plane E2. In particular, the lenses 210 are arranged in the second lateral plane E2 at the grid points of a regular rectangular grid.

In the first lateral plane E1 the light emitting regions 101, 102, 103 are arranged. In particular, the lateral plane E1 runs parallel to the lateral plane E2. For example, each lens 210 of the first optical element 21 is uniquely assigned a plurality of triplets 100. In particular, at least five triplets 100 of the light-emitting component 10 are assigned to a lens 210. In this context, assigned means that a majority of the light L, in particular at least 70%, preferably at least 80%, emitted by a triplet 100, hits exclusively the lens 210 assigned to the triplet 100. In particular, the first optical element 21 is contiguous. For example, the lenses 210 of the first optical element 21 are mechanically connected to each other. In particular, the light-emitting component is connected. In particular, triplets 100, which are assigned to different lenses 210, are mechanically connected to each other.

In particular, each lens 210 forms a pixel P of the 3D display element. Since the light L3, which has passed through the first optical element 21, diverges, an observer perceives the light L emitted by different triplets 100, depending on the viewing angle W of a pixel P. Thus, a different color location or brightness value can be assigned to each pixel P depending on its viewing angle W by selectively controlling the triplets 100. Thus, a three-dimensional image impression can be created using the 3D display element 1.

Figure 3A:
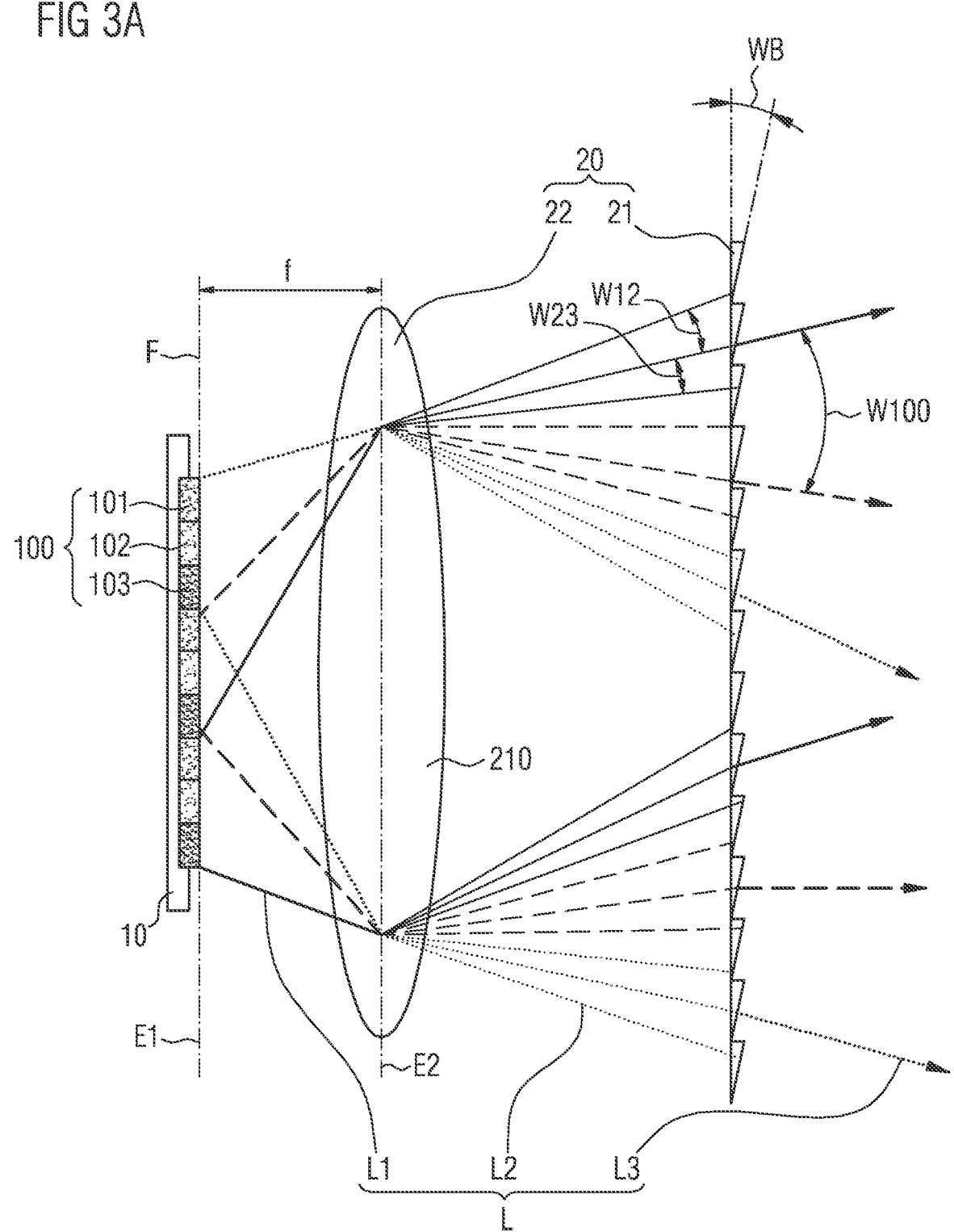
FIG. 3A shows a schematic sectional view of a pixel of a 3D display element according to a third example.

FIG. 3A shows a schematic sectional view of a pixel P of a 3D display element 1 described here according to a third example. The 3D display element comprises a light-emitting component 10 and an optical arrangement 20 comprising a first optical element 21 and a second optical element 22. The light-emitting component 10 comprises a plurality of triplets 100 each having a first 101, a second 102 and a third 103 light emitting regions. The regions 101, 102, 103 are arranged side by side in a first lateral plane E1. The light-emitting component emits 10 light L in a beam direction D. The first optical element 21 is located in the beam direction D between the second optical element 22 and the light-emitting component 10. This means that light L emitted by the light-emitting component 10 passes first through the first optical element 21 and then through the second optical element 22. The first optical element 21 comprises a lens 210 with a focal length f. In particular, the lens 210 is arranged at a distance from the regions around the focal length fin the beam direction D.

In other words, the first lateral plane E1 lies in the focal plane F of the first optical element 21. Light L1 emitted by the light-emitting component 10 can be assigned by an observer to the first 101, the second 102 and the third 103 regions before passing through the first optical element 21. After the light L1 has passed through the optical element 21, the light is divergent light L2. In this example, both light L2 emitted by different triplets and light L2 emitted by different regions 101, 102, 103 of a common triplet 100 diverge.

An observer of the divergent light L2 that has passed through the first optical element 21 and has not passed through the second optical element 22 perceives the light L2 of a triplet 100 depending on the viewing angle W of the lens 210. Thus, the perceived color location and/or brightness value of a triplet varies with the viewing angle W.

The second optical element 22 is a diffraction grating, especially a blaze grating with a blaze angle WB. The second optical element 22 is configured to diffract the light of the wavelength range of the first region 101, the second region 102 and the third region 103 so that the light L3 is collimated within a tolerance range after passing through the second optical element 22 when emitted from a common triplet. In particular, light L3 after passing through the second optical element 22 can be assigned a triplet 100 by an observer, but not to the individual regions 101, 102 and 103 of the triplet 100. Advantageously, when using a blaze grating as the second optical element 22, the blaze angle WB of the grating can be selected such that the diffraction order in which the light L3 of different regions 101, 102, 103 of a triplet 100 is collimated has a particularly high intensity.

The light L2 of first 101 and second 102 regions of a triplet 100 has a divergence angle W12 after passing through the first optical element 21. The light L2 from second 102 and third 103 regions of a triplet 100 has a divergence angle W23 after passing through the first optical element 21. The light L2 is diffracted by a diffraction angle at the second optical element 22 depending on its wavelength. For example, the divergence angle W12, after passing through the first optical element 21, corresponds to the difference between the diffraction angles of a diffraction of the same order of the light of the first 101 and the second 102 region, after passing through the second optical element 22. Further, for example, the divergence angle W23, after passing through the first optical element 21, corresponds to the difference of the diffraction angles of a same order diffraction of the light of the second 102 and third 103 regions, after passing through the second optical element 22. Thus, the light L3 of the regions 101, 102, 103 of a triplet 100 is collimated after traversing the second optical element 22.

The divergence angle W100 of the light L3 of different triplets 100 is measured along the direction along which the triplets 100 are arranged side by side. In particular, the divergence angle W100 and the viewing angle W are in the same plane. The divergence angles W12, W23 of the light L3 of different regions 101, 102, 103 of a triplet 100 are measured along the direction along which the regions 101, 102, 103 are arranged next to each other.

Figure 3B:
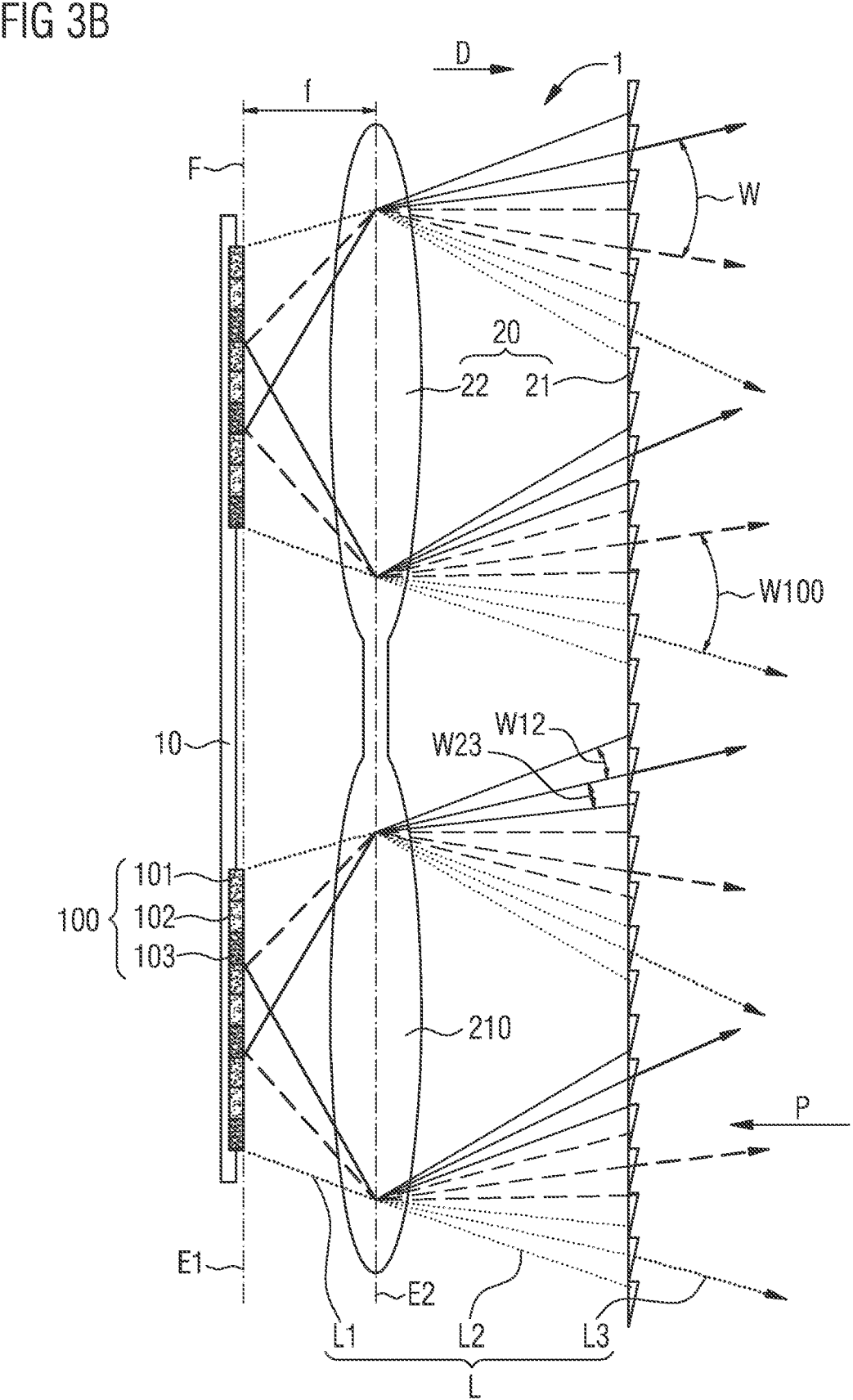
FIG. 3B shows a schematic sectional view of two pixels of a 3D display element according to a fourth example.

FIG. 3B shows a schematic sectional view of a 3D display element 1 described here according to a fourth example. Analogous to the example shown in FIG. 3A, the first optical element 21 is located in beam direction D between the light-emitting component 10 and the second optical element 22. Furthermore, the second optical element 22 is, for example, a diffraction grating, in particular a blaze grating. The first optical element 21 comprises a plurality of lenses 210 arranged side by side in the lateral plane E2. In particular, the lenses are arranged at the grid points of a regular rectangular grid. Each lens 210 is uniquely assigned to a plurality of triplets 100. The lenses 210 are mechanically fixed connected to each other. Each lens 210 of the first optical element 21 forms a pixel P of the 3D display element. Light L3 emitted by different triplets 100 through a common lens 210 is divergent. Light L3 emitted from different regions 101, 102, 103 of the same triplet 100 is collimated. In particular, the perceived color location and brightness of a pixel P depends on the viewing angle W of the observer. Depending on the viewing angle W, an observer perceives another triplet 100, which is assigned to the lens 210. Thus, by means of the triplets 100 assigned to a common lens 210, the color location and the brightness of the pixel P can be adjusted as a function of the viewing angle W. Thus, a three-dimensional image impression can be created with the 3D display element 1.

Figure 4A:
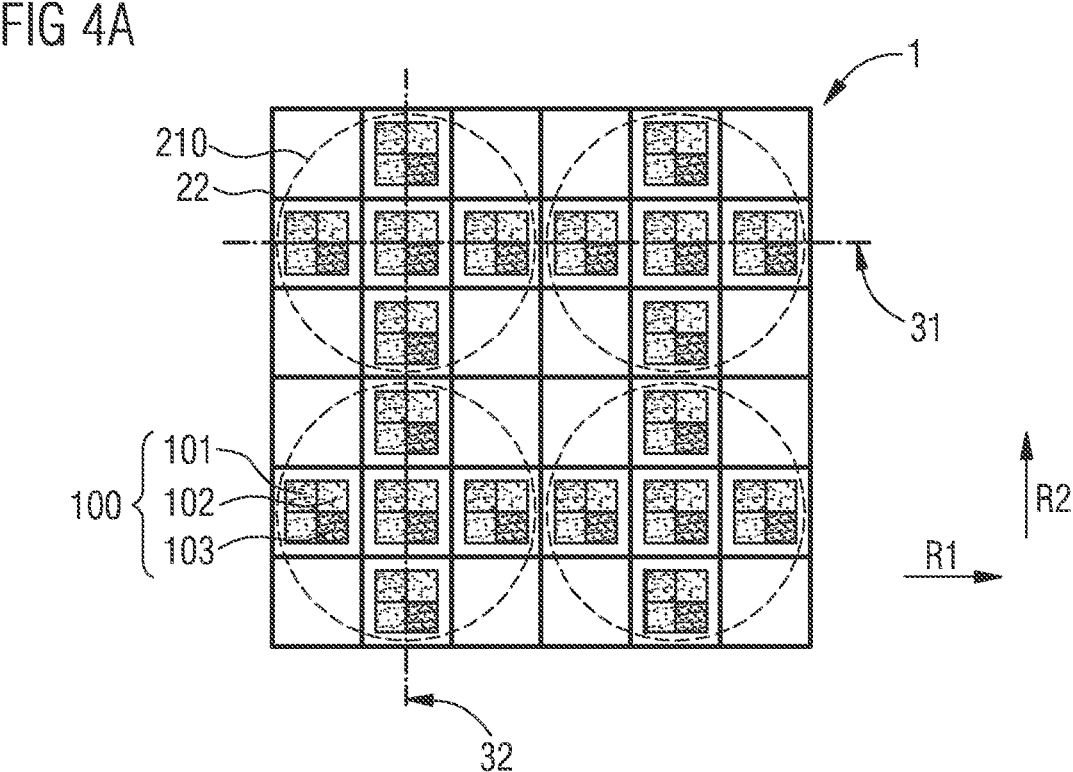
FIGS. 4A and 4B show schematic top views of a 3D display element according to the first and third example.

FIG. 4A shows a schematic plane view of a display element 1 according to the first example. The 3D display element 1 comprises a light-emitting component 10, a first optical element 21 and a second optical element 22. In this example, the second optical element 22 is formed as a plate with opening, where the openings frame the triplets 100 at least in projection onto the first lateral plane E1. The light-emitting component comprises a plurality of triplets 100 and the first 21 and the second 22 optical elements are subordinated to the triplets 100 in this order. In particular, five triplets 100 are assigned to each lens 210 of the first optical element 21. The triplets 100 assigned to a common lens 210 are arranged side by side in a first lateral direction R1 and in a second lateral direction R2. Thus, each pixel P has at least a first 31 and a second 32 observation planes. The first lateral direction R1 and the beam direction D lie in the first observation plane 31. The second lateral direction R2 and the beam direction D lie in the second observation plane. The first 31 and the second observation plane 32 are perpendicular to each other. Using the 3D display element according to the first example, five different color locations and brightness values per pixel P can be displayed in two observation planes 31, 32.

Figure 4B:
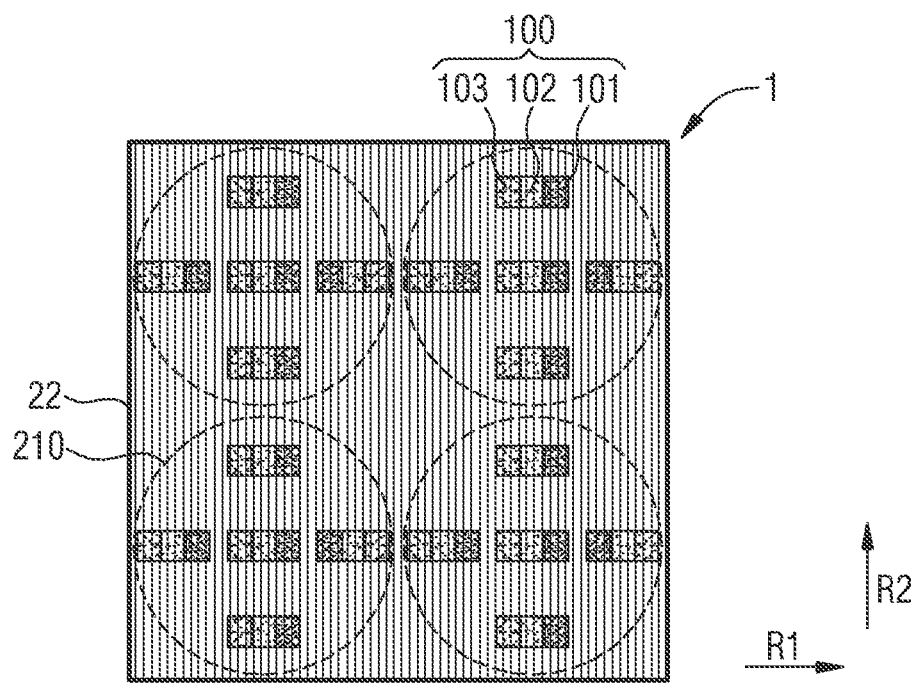

FIG. 4B shows a schematic plane view of a display element 1 according to the third example. The 3D display element 1 comprises a light-emitting component 10, a first optical element 21 and a second optical element 22. In this example, the second optical element 22 is a diffraction grating, in particular a blaze grating. The light-emitting component comprises a plurality of triplets 100 and the second 22 and the first 21 optical elements are subordinated to the triplets in this order. In particular, the regions 101, 102, 103 of all triplets 100 are arranged next to each other in the first lateral direction R1. The second optical element is arranged in such a way that the light of different regions 101, 102, 103 of a triplet 100 is diffracted in the first lateral direction R1. Thus, light L3 emitted by the 3D display element of a triplet is collimated.

The invention is not restricted to the exemplary embodiments by the description on the basis of said exemplary embodiments. Rather, the invention encompasses any new feature and also any combination of features, which in particular comprises any combination of features in the patent claims and any combination of features in the exemplary embodiments, even if this feature or this combination itself is not explicitly specified in the patent claims or exemplary embodiments.

The invention claimed is:

1. A 3D display element comprising:
a light-emitting component configured to emit light; and
an optical arrangement,
wherein the light-emitting component comprises a plurality of triplets, each triplet comprising a first, a second and a third light-emitting region,
wherein the triplets are arranged side by side in a first lateral plane,
wherein the regions are arranged side by side in the first lateral plane,
wherein the optical arrangement is configured to diverge light of adjacent triplets passing through the optical arrangement,
wherein light of a triplet passing through the optical arrangement is mixed,
wherein the optical arrangement comprises a first optical element and a second optical element,
wherein the first optical element is arranged between the light-emitting component and the second optical element in a beam path,
wherein the second optical element is a diffractive optical element, and
wherein the light-emitting component is arranged in a focal plane of the first optical element.

2. The 3D display element according claim 1, wherein the first, second and third regions are configured to emit pairwise light of a different wavelength range.

3. The 3D display element according to claim 1, wherein the first optical element comprises a lens array in which a plurality of lenses are arranged side by side in a second lateral plane, and wherein a number of triplets is greater than a number of lenses of the lens array.

4. The 3D display element according to claim 3, wherein the lens array comprises a plurality of cylindrical lenses.

5. The 3D display element according to claim 3, wherein the first lateral plane and/or the second lateral plane are curved.

6. The 3D display element according to claim 5, wherein a lens of the lens array is arranged in a beam path of light of at least five triplets.

7. The 3D display element according to claim 3, wherein triplets associated with a common lens are arranged side by side in at least two directions along the first lateral plane.

8. The 3D display element according to claim 1, wherein the first, second and third regions are arranged side by side along a common lateral direction.

9. A 3D display element comprising:
a light-emitting component configured to emit light; and
an optical arrangement,
wherein the light-emitting component comprises a plurality of triplets, each triplet comprising a first, a second and a third light-emitting region,
wherein the triplets are arranged side by side in a first lateral plane,
wherein the regions are arranged side by side in the first lateral plane,
wherein the optical arrangement comprises a first optical element and a second optical element,
wherein the second optical element is arranged in a beam path between the light-emitting component and the first optical element,
wherein the second optical element is a grating which forms a frame around each triplet respectively,
wherein the first and second optical element are arranged in direct contact with each other,
wherein the optical arrangement is configured to diverges light of adjacent triplets passing through the optical arrangement, and
wherein light of a triplet passing through the optical arrangement is mixed.

* * * * *